US005594843A

United States Patent [19]
O'Neill

[11] Patent Number: 5,594,843
[45] Date of Patent: Jan. 14, 1997

[54] METHOD AND APPARATUS FOR CREATING THREE-DIMENSIONALITY IN A PROJECTED TELEVISION IMAGE

[75] Inventor: William J. O'Neill, Ann Arbor, Mich.

[73] Assignee: Depth Enhancement, Inc., Ann Arbor, Mich.

[21] Appl. No.: 106,258

[22] Filed: Aug. 13, 1993

Related U.S. Application Data

[63] Continuation-in-part of Ser. No. 873,400, Apr. 24, 1992, abandoned.

[51] Int. Cl.$^6$ .............................. G06F 15/00; G09G 5/00
[52] U.S. Cl. ............................... 395/127; 345/2; 348/721
[58] Field of Search .................... 395/127–129, 395/137, 141, 119; 348/40–60, 721, 734, 717; 345/2

[56] References Cited

U.S. PATENT DOCUMENTS

| | | | |
|---|---|---|---|
| 1,351,430 | 8/1920 | Luboshey. | |
| 1,840,931 | 1/1932 | Bjorn. | |
| 1,879,793 | 9/1932 | Chubb. | |
| 1,944,187 | 1/1934 | Marsat. | |
| 2,023,246 | 12/1935 | Sears | 88/20 |
| 2,084,795 | 6/1937 | Donle | 88/16 |
| 2,218,875 | 10/1940 | Parsell | 88/16 |
| 2,222,300 | 11/1940 | Pistor et al. | 88/16 |
| 2,232,774 | 2/1941 | Deninson | 88/16 |
| 2,241,041 | 6/1941 | Sauer | 88/16 |
| 2,252,632 | 8/1941 | Jones | 88/26 |
| 2,268,338 | 12/1941 | Kober et al. | 88/16 |
| 2,282,947 | 5/1942 | Sherbinen | 88/16 |
| 2,320,760 | 6/1943 | Surre | 88/16 |
| 2,348,410 | 5/1944 | Pastor | 88/16 |
| 2,415,550 | 2/1947 | Yarosh | 88/16 |
| 2,623,433 | 12/1952 | Stipek | 88/16 |
| 2,835,159 | 5/1958 | Rhea | 88/1 |
| 2,885,927 | 5/1959 | Riker, Jr. | 88/28 |
| 2,891,440 | 6/1959 | Barake | 88/16 |
| 3,537,782 | 11/1970 | Craig | 352/86 |
| 3,820,873 | 6/1974 | Redington et al. | 350/125 |
| 4,640,588 | 2/1987 | Tanaka | 350/516 |
| 4,744,633 | 5/1988 | Sheiman | 350/132 |
| 4,799,763 | 1/1989 | Davis et al. | 350/137 |
| 4,807,978 | 2/1989 | Grinberg et al. | 350/3.73 |
| 4,871,233 | 10/1989 | Sheiman | 350/286 |
| 4,905,076 | 2/1990 | Annegarn et al. | 358/3 |
| 4,945,407 | 7/1990 | Winnek | 358/88 |
| 5,002,364 | 3/1991 | Steenblik | 350/144 |
| 5,081,540 | 1/1992 | Dufresne et al. | 359/30 |
| 5,225,861 | 6/1993 | Marks | 353/7 |
| 5,311,220 | 5/1994 | Eichenlaub | 348/55 |

*Primary Examiner*—Mark R. Powell
*Assistant Examiner*—Huynh Ba
*Attorney, Agent, or Firm*—Gifford, Krass, Groh, Sprinkle, Patmore, Anderson & Citkowski

[57] ABSTRACT

Apparatus and methods are described whereby a projected television image is divided into two horizontally displaced images, and an observer wears glasses to synthesize three-dimensionality from the 2-D image. Switching means are provided so that the components associated with creating the 3-D effect may be made operative or inoperative, either mechanically or electrically. One or more wedge prisms or holographic optical elements are mounted on a frame along with polarizing filters, and a lever is used to transfer these elements into and out of the beam of a projected television image. Alternatively, an electrically or acoustically activated spatial light modulator and liquid-crystal polarizers may be left in the path of the projected beam and made operative and inoperative by way of electrical signals. The invention may be used with both single-source and multi-source projected images, and may be used in conjunction with both frontal and rear projection.

21 Claims, 5 Drawing Sheets

METHOD AND APPARATUS FOR CREATING THREE-DIMENSIONALITY IN A PROJECTED TELEVISION IMAGE

RELATED APPLICATIONS

This is a continuation-in-part of U.S. application Ser. No. 07/873,400, filed Apr. 24, 1992, abandoned.

FIELD OF THE INVENTION

The present invention relates generally to techniques for creating three-dimensionality in a two-dimensional image, and, in particular, to methods and apparatus for imparting three-dimensionality in a projected television image.

BACKGROUND OF THE INVENTION

Although human beings naturally perceive three dimensions through stereoscopic vision, most electronic images are formed on two-dimensional display screens. Commercial television, for instance, is 2-D. Many advantages are to be gained from techniques for perceiving three dimensions from a two-dimensional screen, including the enhanced understanding of technical displays, and the increased enjoyment of programming intended for entertainment purposes.

Various techniques are understood and available to provide true three-dimensional viewing through a two-dimensional display screen. A straightforward approach is to record the image to be viewed through two lenses, and provide the viewer with glasses incorporating electro-optical shutters which selectively present only one perspective to each eye, thereby recreating depth perception in accordance with the vantage used for the original recording. Electronically synchronized liquid-crystal shutters are often used in the viewing glasses associated with such systems.

Other genuine three-dimensional viewing techniques are possible. However, in all cases, to realize true three-dimensionality, stereoscopic recording must be employed. As such, a duplication of hardware, including separate recording, storage and display means must necessarily be provided in order to accommodate faithful reproduction of the different perspectives delivered to the two eyes of the viewer. This complication not only results in increased equipment, but also requires in more sophisticated system overall, involving alignment, synchronization and increased bandwidth requirements for transmission and display, as in the case of true 3-D television. To implement such systems on a large scale basis would require fundamental changes to the infastructure now used for television broadcasting, as well as alterations to the media now used for video and/or film recording.

The added cost and complexity of true 3-D imaging has led to the desire to develop illusionary or pseudo-stereoscopic techniques and systems which, broadly speaking, manipulate a monocular or two-dimensional image in such a way that an illusion of three-dimensionality is perceived by the viewer. These systems represent a compromise between providing all of the necessary hardware and control required for true 3-D, but require the viewer to synthesize three dimensions, when, in fact, only two-dimensional information is provided. Such systems may split the two-dimensional image into two temporally offset versions of the image then, using glasses with special lenses, force each eye to see only one of the offset images. Horizontally displaced images are most effective, since human eyes are naturally horizontally displaced.

With true three-dimensional perception, the separation of the eyes of the viewer introduces parallax into the observed scene. Part of the parallax contribution results in an offset of one image relative to the other such that an object at the center of the scene will be displaced to the right of the center for the left eye and to the left of the center for the right eye. Various degrees of horizontal offset will occur at various distances such that closer objects will be more offset than objects which are further away.

In contrast, a two-dimensional image does not contain offset information as described above. An artificial offset may, however, be introduced by simultaneously presenting an identical image in two slightly different horizontal positions to both eyes. Such a technique, if properly applied, causes the eye muscles to converge at a plane in space which is different from the true plane of projection, resulting in an image which is perceived to be three-dimensional.

To create such a pseudo-stereoscopic image electronic means may be employed. For example, in my copending parent application, I describe an electronic module which is operatively connected between an incoming signal source and a display device, the module performing horizontal delay and scan adjustments to alternating fields of the television image. Vertical size and luminance may be modified as well to further enhance the perception of three-dimensionality. A pair of liquid-crystal glasses operatively communicate with the module to force each eye to perceive only one of the alternating field.

Electronic means are effective in modifying a 2-D image so as to achieve an illusion of three dimensionality, but such an "active" approach adds significantly to the sophistication of the image viewing apparatus. Although a scene need not be recorded in 3-D, the circuitry required to adjust horizontal and vertical dimensions and brightness, is nevertheless complex, and, although these functions may be performed external to the television receiver, the greatest advantage is realized by performing such functions internal to the television receiver, thus increasing the sophistication and cost of a consumer item. Whether recorded three-dimensionally or synthesized, active approaches which alternate between eyes further introduce at least some degree of "flicker" due to the refresh period, approximately 60 Hz with NTSC, as well as any refresh-related harmonics which are present.

Therefore, although such electronics-intensive pseudo-stereoscopic systems are available for creating three-dimensionality in a 2-D image, the circuitry involved may be beyond the means of a large class of consumers. If a less complex approach were available to derive geometrically offset versions of a two-dimensional image, it may present an advantage in terms of affordability and reliability. In the case of projection television, such a simplified system would ideally be compatible with color images associated with either a single projection lens or multiple projection lenses.

SUMMARY OF THE INVENTION

The present invention provides a simple and reliable means for imparting three dimensionality to a conventional projected television image, the apparatus and methods being applicable to both single lens and multi-lens type systems. A light-redirecting device is operative to divide the projected television image into two versions of the image which are horizontally displaced from one another. A pair of optical filters, preferably linear polarizing filters having their axes of polarization at right angles to one another, are positioned with one in each path of the two projected images. A pair of glasses is worn by the viewer, the glasses including a matching set of filters, so that each eye sees only one of the horizontally displaced images.

The system is not limited to the use of linear polarizing filters, and, in alternate embodiments, circular polarizers, oppositely colored filters, and any other type of light modifying device may be used so long as each eye sees substantially only one of the two displaced images.

Switching means are provided whereby the means used to create and filter the displaced images may be made operative or inoperative, thus allowing a viewer to watch either a pseudo-stereoscopic image using the glasses or a conventional picture without the glasses. In either case, both eyes see a continuous image, not time-shared as in the active raster-scan switching techniques previously described.

In the preferred embodiment, the light-redirecting device takes the form of one or more wedge-shaped prisms of transparent material disposed in the beam of the projected television image. A holographic optical element may be used instead of the wedge-shaped element. The filters are preferably layers of a polarizing material, and these filters and wedge prisms are placed on a supporting frame which is operatively connected to a mechanical or electrical translation device, thus enabling a viewer to introduce and remove the 3-D effect. In the case of an electrically assisted introduction, switching means may be activated with a hand-held remote-control unit which operates in conjunction with an electrically or magnetically actuated drive mechanism.

In an alternative embodiment, the light redirecting and filtering are under electronic control with no moving parts, the light redirecting device being in the form of an electro-optic or electro-acoustic spatial modulator, and the polarization being provided by liquid-crystal materials. In their "off" state, the light redirecting device and filters do not interfere with the path of the projected television image, thus allowing the viewer to see the conventional picture. However, when made electrically active, two displaced and oppositely polarized images are formed, thereby enabling a viewer to wear the glasses and perceive three-dimensionality.

The invention also includes means whereby uniformity of brightness is maintained as the devices associated with the creation of the three-dimensional effect are made operative. In the embodiment employing a wedge prism, a single wedge is preferably disposed horizontally across a portion of the projected beam. Alternatively, two wedges may be used, these being inserted either into diagonally opposite quadrants of the projected or partially covering top and bottom halves of the projected image. Such arrangements tend to more evenly distribute the light associated with the redirected beam, thus providing a set of displaced images exhibiting more uniform brightness. Alternatively, a filter, optically graded along a path extending radially outwardly from its central axis, may be inserted into the path of the projected image, thereby attenuating the light more toward its center and less around its periphery. Electronic brightness non-uniformity correction circuits may also be used and interfaced to the switching means so as to become operative along with the light redirection and filtering elements, whether made operative mechanically or electrically, including via remote control.

DETAILED DESCRIPTION OF THE PREFERRED EMBODIMENT

Figure 1:
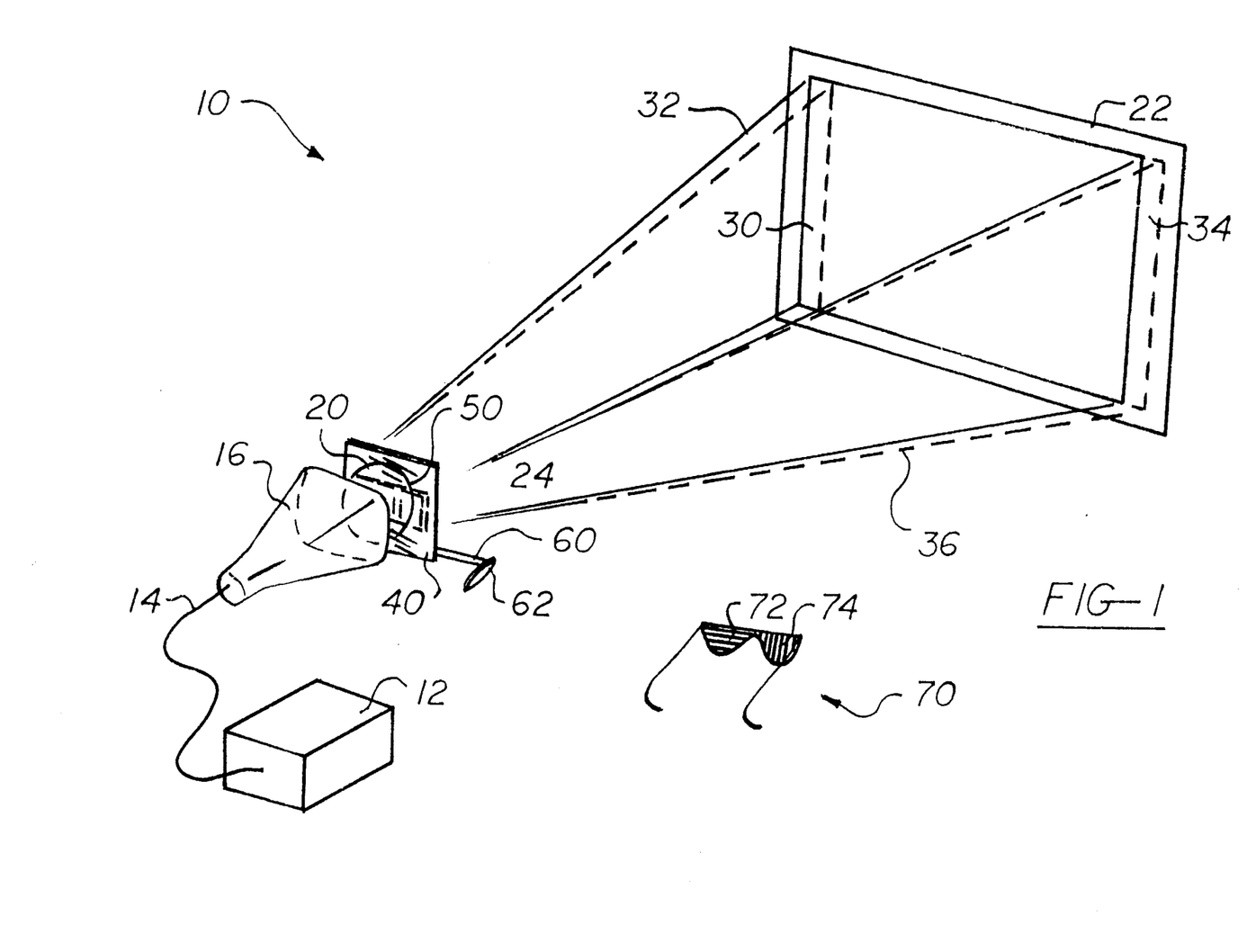
FIG. 1 is a drawing which shows a wedge prism placed in the path of a projected two-dimensional image, thereby creating two images horizontally displaced from one another.

Now making reference to the figures, there is depicted in FIG. 1 a system, indicated generally at 10, wherein a video image generated within module 12 is delivered to a high-intensity projection-type color monitor 16 via cable 14. Module 12 is drawn in simplified schematic form and may represent any source of a video signal including, but not limited to, a television receiver or video playback means such as a VCR or video disc player.

The video image is projected through a lens assembly 20. In the absence of the components which will shortly be described to impart three-dimensionality, the image projected by monitor 16 through lens 20 would appear as a single two-dimensional image on surface 22. In accordance with the present invention, however, a light redirecting element is disposed in the beam associated with the projected image. In the embodiment depicted in FIG. 1, this light-redirecting element takes the form of a wedge prism 24 constructed of a material substantially transparent to the projected image, such as optical glass or plastic. With this wedge prism disposed in the path of the projected image, two images 30 and 34 are produced on surface 22, these two images being horizontally displaced from one another, the projections of which are defined by solid lines 32 and broken lines 36, respectively.

Any light-redirecting means may be used in place of the wedge prism, including materials exhibiting a sufficiently high index of refraction and holographic optical elements.

A layer of polarizing material 40 is placed proximate to wedge 24 so that one of the two images is linearly polarized in accordance with the polarization of layer 40. The light which does not pass through wedge prism 24, that is, the light forming projection 32 and creating image 30, is polarized with a different layer of polarizing material 50 so that this image is linearly polarized at right angles to the displaced other.

Although the axes of polarization for the two images are shown vertical and horizontal, respectively, they may be diagonal or at any angle so long as the two axes are substantially normal to one another. Polarization is not the only possible means to differentiate the displaced images. Color filtering may be used, though this presents technical problems with full-color images. It is also possible to encode the displace images holographically.

Additionally, although wedge prism 24 and polarizers 40 and 50 are shown as being disposed forwardly of projection lens 20, they may be located between the source of the projected image and the lens assembly or within the lens assembly itself, and in any order relative to one another so long as the two horizontally displaced images are produced upon a viewing surface.

As part of the present invention, wedge prism 24 and polarizing filters 40 and 50 are mounted to form a single physical unit so that these elements may be moved into the path of the projected image so as to create a three-dimensional effect, and out of the path so that a viewer may see a conventional two-dimensional picture. As shown in FIG. 1, one technique for translating these elements into and out of the path of the projected image is to make the combined unit rotatable about an axis 60, the unit being connected to a manually adjustable device such as lever 62. When lever 62 is turned clockwise, as shown by the arrow in the figure, wedge 24 and filters 40 and 50 are rotated out of the path of the projected being, thus enabling a user to see only a single image with no displacement. Alternative translation units will be discussed with reference to FIGS. 4 and 5.

A pair of glasses, shown generally at 70 in FIG. 1, are worn by each viewer wishing to perceive three-dimensionality from the projected images when wedge prism 24 and filters 40 and 50 are introduced into the path of the projected beam of the two-dimensional image. One lens 72 of the glasses contains a linear polarizer with its axis of polarization parallel to that of one of the images, whereas the other lens of the glasses contains a polarizer with its axis of polarization parallel to that of the other image. As such, one eye sees only one of the images, while the other eye sees only the other. In this way, three-dimensionality is perceived by the viewer as the two images, horizontally displaced from one another, are mentally combined. Again, although the left lens of the glasses matches the non-displaced image and the right lens matches the images seen by the two eyes may be reversed from that depicted in any of the figures contained herein, as it is only necessary that each eye sees only one of the two images.

Although FIG. 1 depicts "passive" light redirecting means in the form of a wedge prism which is physically moved into and out of the path of the projected image, as an alternative embodiment, electrically and/or acoustically active elements may instead be used. Such elements may remain in the path of the projected beam and made operative as a function of an applied signal. It is well known in the art of spatial light modulation that certain crystalline materials may be used to alter the direction of light passing through it in accordance with an applied voltage or acoustic signal. See, for example, *Fundamentals of Photonics* by B. Saleh and M. C. Teich, John Wiley & Sons, Inc. Publishers, Chapter 18 "Electro-Optics" and Chapter 20 "Acousto-Optics".

In conjunction with an active spatial light modulator, polarizing filters 40 and 50 in FIG. 1 may likewise be replaced with electronically active materials such as liquid crystal materials, which twist the axis of polarization in accordance with an applied signal, thus resulting in a system which is made operative entirely through electronic activation without moving parts.

Figure 2A:
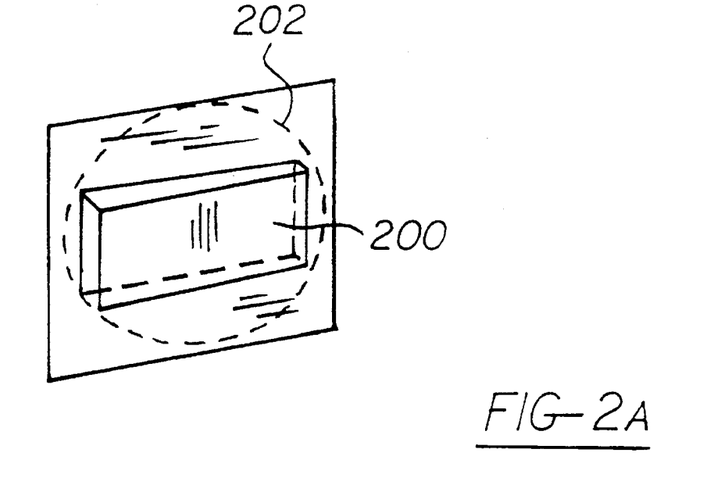
FIG. 2A is a drawing which shows a single wedge prism disposed horizontally across a projected image.
Figure 2B:
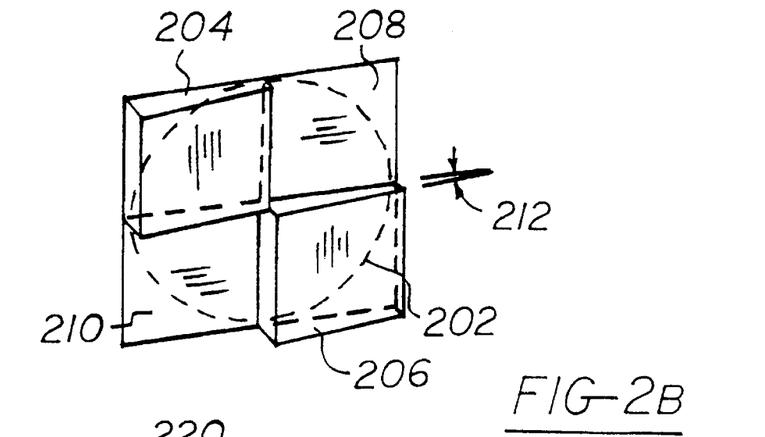
FIG. 2B is a drawing which shows an alternative placement of two wedge prisms in diagonally opposite quadrants of the projection in order to improve the uniformity of brightness.

FIG. 2 shows alternative arrangements for disposing light-redirecting wedge prisms and polarizers in the path of a projected television image. FIG. 2A illustrates the preferred embodiment, wherein a single wedge prism 200 is horizontally disposed across the projected beam 202. The right and left ends of the wedge prism need not extend past the outer perimeter of the beam. In FIG. 2B, the cross-section of a projected image beam 202 is divided into quadrants, and two wedge prisms are mounted such that they occupy diagonally opposite positions. Specifically, a first wedge prism 204 is placed in the upper left-hand quadrant of the beam and a second wedge prism 206 is placed in the lower right-hand quadrant. The wedges could have alternatively been placed in the upper right-hand and lower left-hand quadrants, respectively, so long as the two wedges are diagonally disposed.

Additionally, although the wedges are shown with their thicker portions being leftward in the figure and sloping toward their thinner portions rightwardly, the direction of slope may be reversed wherein the thicker portions are toward the right. It is only necessary that the sloping be consistent relative to all the wedge prisms used. Moreover, since it is only the degree of slope and not specific thicknesses which matter, one of the two wedges may be generally thicker or thinner so long as the slope, as defined by angle 212 in the figure, is adhered to by all the wedge prisms used.

The areas covered by the wedge prisms in FIG. 2 are linearly polarized in a first direction, whereas the remaining areas, such as areas 208 and 210, are linearly polarized along an axis which is normal to that associated with the wedge prisms. As mentioned in reference to FIG. 1, although the axes of polarization in FIG. 2 are shown to be vertical and horizontal, these axes may be at any diagonal or angle so long as the resulting two images are polarized oppositely to one another.

Figure 2C:
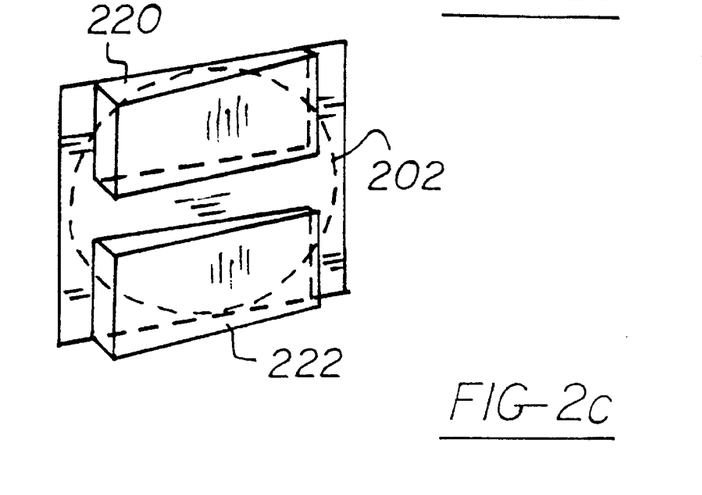
FIG. 2C is a drawing of an alternative placement of two wedge prisms above and below one another in order to improve the uniformity of brightness.

In FIG. 2C, a first wedge prism 220 is displaced over a large portion of the upper half of the projected beam 202 and a second wedge prism 222 is disposed over a large portion of the lower half of the projected beam. Again, the areas associated with the wedges are polarized in a first direction and all other areas are polarized at an axis normal to that associated with the wedges.

So long as the system of the present invention creates two images which are horizontally displaced from one another, three dimensionality will be perceived from a two-dimensional image when the glasses are worn. As such, the system may generate a single horizontally displaced image and a non-displaced image, or it may generate two images which are horizontally displaced relative to the two-dimensional image, so long as the resulting two images are horizontally displaced from one another.

While, at first glance, the arrangements shown in FIG. 2 may not seem capable of creating a horizontally displaced version of the projected image, if it is kept in mind that all points of the image contained in the projected beam must project through all points of both wedge prisms and all areas surrounding them, it will be appreciated that to practice the present invention, it is only necessary that a percentage of the cross-section of the projected image be subjected to a horizontally oriented redirection to form a displaced image, and that all other areas not subjected to redirection will result in a non-displaced version of the image. As such, any arrangement of wedge prisms may be used in accordance with the present invention, so long as the slope from the thicker edge of each wedge toward the thinner edge of each wedge be horizontally oriented and cover a substantial enough area of the beam cross-section to create a perceptible displaced version of the image.

In conventional projection television systems, each image is formed on a tube with dimensions on the order of several inches. For example, tubes having a five inch diagonal are common. The image formed on this tube is subject to non-uniform brightness due to the requirement that such tubes incorporate a flat face plate upon which the image is formed. Additionally, the relatively large size of the image formed on each tube contributes to non-uniform light collection by the lens, which results in the most efficient collection being proximate to the center of the image. Intensity falls off rapidly near the edge of the tube and, most significantly near the corners. Assuming the intensity fall off follows an inverse square law on both sides of the lens, the non-uniformity of the resulting brightness increases non-linearly as the projection angle increases.

If one divides the image down its vertical center line edge darkening will result, even in narrow-angle projections. Such darkening may be very near the edge and imperceptible if a long projection distance is utilized, such as in movie theaters. However, in a projection television system, the lens must be as close as possible to the tube upon which the image is formed in order to maximize overall brightness. This creates a design paradox, which results in a comprise between uniformity and brightness. When such non-uniform brightness is present, the edge darkening produces "ghosting" or image "cross talk". If a projection television image is divided vertically through the entire extent of the beam, these undesirable effects may reach objectional proportions. However, using the alternative wedge prism placements depicted in FIG. 2, especially that of FIG. 2A, undesirable effects such as cross talk are reduced to a level found in true three-dimensional recording and display.

Figure 3:
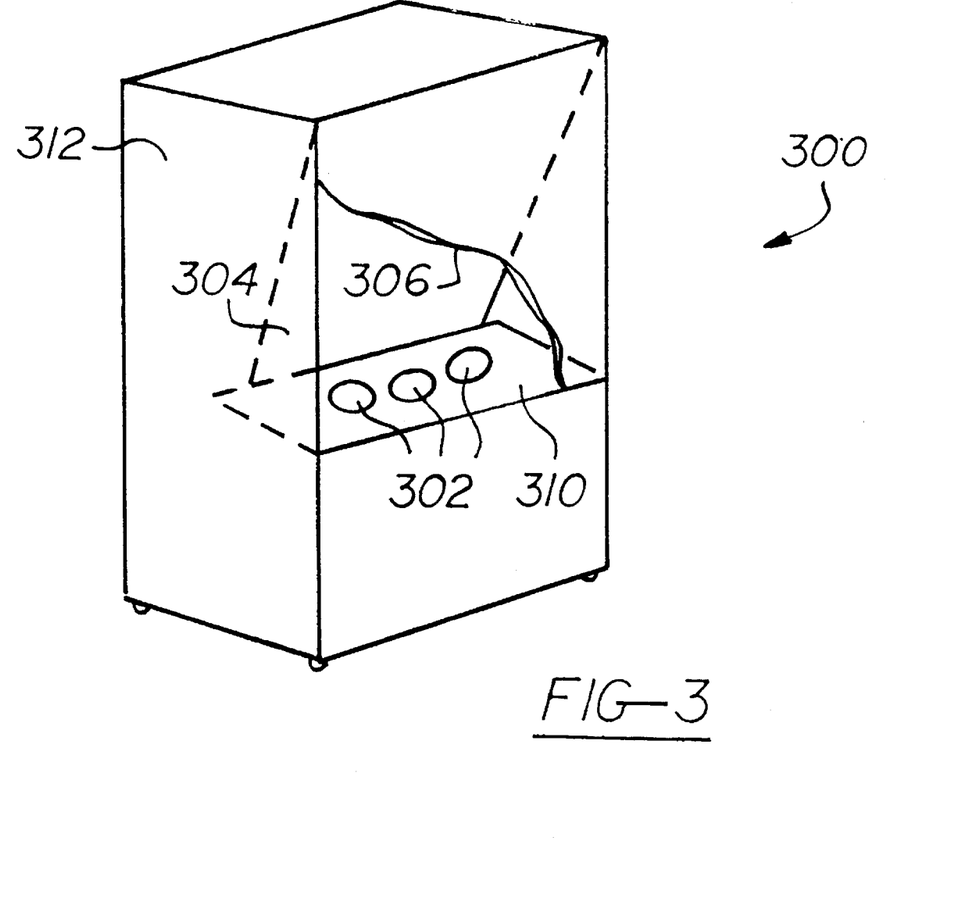
FIG. 3 is an oblique drawing of a projection TV system wherein the screen has been removed to show the area in which devices associated with the present invention may be installed.

The present invention is not limited to front-projection images, nor is the idea constrained to a single projection. In FIG. 3, there is shown a typical rear-projection type of television system, drawn generally at 300 wherein three projection lenses 302, each projecting a single-color component of a television image, are reflected by a surface 304 so as to impinge upon the backside of a screen 306. The projection lenses 302 are typically mounted on a panel 310 within an enclosure 312.

Although the details of screen 306 are not shown in FIG. 3, such screens typically include several layers, each layer performing a particular function to facilitate viewing by a wider audience. For example, most such screens include a Fresnel-type of focusing lens, a diffusing member and a lenticular array which spreads the focused image horizontally, thus allowing a wider audience within a room to see a substantially bright image on the front side of screen 306. Importantly, none of these elements corrupt the polarization introduced by the filers used in accordance with the present invention. In fact, a lenticular-type of screen, whether for rear-projection or front-projection, is the preferred type of viewing screen for the present invention, though any type of screen which maintains the relative difference in polarization between the displaced and non-displaced images may alternatively be utilized, including ground-glass types of screens.

FIG. 4 shows a closeup of panel 310, now including a mechanical switching means which may be used to place an image redirection device and polarizers into the path of each of the single-color projected beams, and to remove these elements from their respective beams when a viewer does not wish to perceive the illusion of three-dimensionality. To ensure convergence on the display surface, the light redirection device may be tailored to affect light of different wavelengths differently. For example, if the light redirection device is in the form of a recorded hologram, different colors may be recorded separately and the amount of redirection made to be a function of color wavelength to improve final convergence. The need for convergence correction becomes more important when more than one light redirection device is used as is common in projection TV systems utilizing a plurality of single-color beams. In the case of multiple projections, the image redirection device associated with each beam may preferably be designed independently of the other redirection devices to ensure convergence of the color with which each redirection device is associated. For example, if wedge prisms are used as the image redirection devices, one or more geometrical properties of each wedge prism may be adjusted so that the final horizontally displaced images maintain optimal convergence. Among the geometrical properties of a wedge prism which may be adjusted are its angle of slope, thickness and cross sectional area.

Figure 4A:
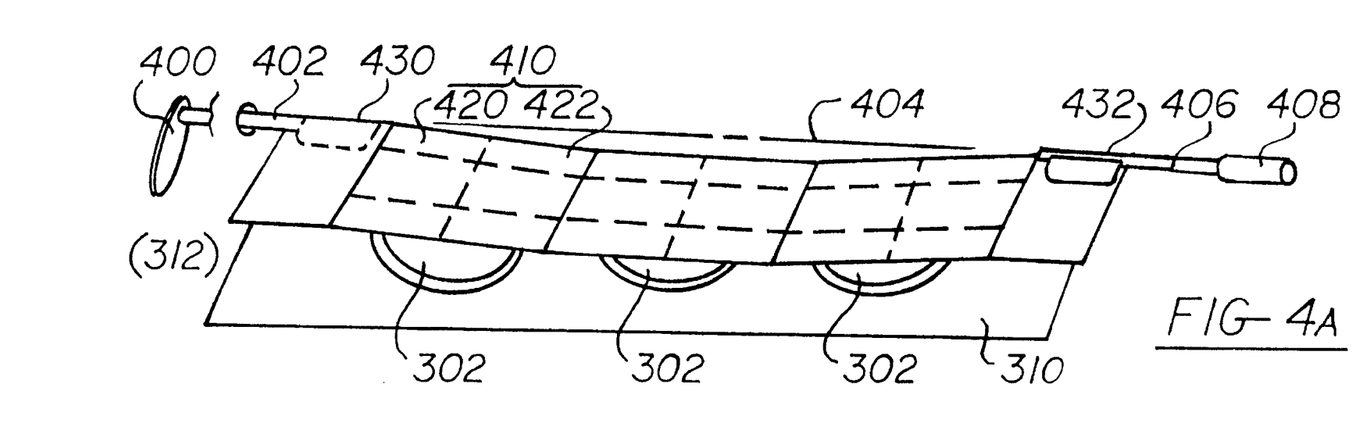
FIG. 4A an oblique drawing of a mechanically operative version of the present invention, wherein a wedge prism and polarizing filters associated with each beam in a three-lens projection television system are physically translated into and out of the projection paths.

In FIG. 4A, handle 400, which protrudes through the wall of enclosure 312, is shown in a downward position. This lever may take the form of any type of handle or knob so long as an operator is capable of mechanically manipulating the devices into and out of their respective paths. Lever 400 is connected to a rod 402 having an axis 404. A second rod section 406, coaxial to that of segment 402, is rotationally operative within a sleeve 408 on the side of the assembly away from handle 400. Between rod segments 402 and 406, there are disposed three sections, each with a wedge prism and polarizers, one of which is identified at 410. These three sections are attached on the left and right-hand edges of the figure to rod sections 402 and 406 via fasteners 430 and 432, respectively. Each of these three segments, one associated with each of the single-color projection lenses 302, contains a polarized wedge prism 420 and an oppositely polarized area 422 which is not associated with a wedge prism.

Although the system depicted in FIG. 4A shows a single wedge associated with each single-color lens, it should be understood that any of the alternatives described with reference to FIG. 2 may alternatively be used, as well as alternatives which have been alluded to but not specifically described. Continuing the reference to FIG. 4, with lever 400 in the position shown in FIG. 4A, each single-color projection lens 302 is covered by a wedge prism and polarizers, thus creating three separate displaced and non-displaced projections which converge as two full-color displaced and non-displaced images on screen 306.

Figure 4B:
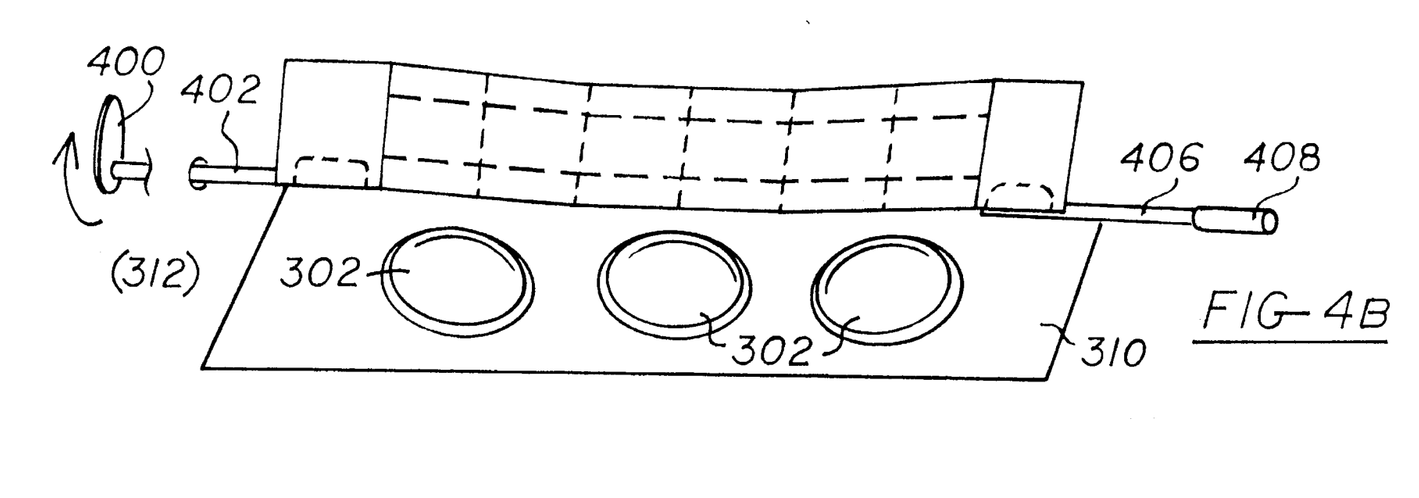
FIG. 4B is an oblique illustration of the system in FIG. 3A, but with the wedge prisms and polarizers removed from their respective projection paths, thus enabling a viewer to watch a conventional projection TV image 2-D without glasses.

With lever 400 turned upwardly, however, as shown in FIG. 4B, all wedges and polarizers are pivoted about the axis associated with rod segments 402 and 406, thus removing all of these elements from their respective projection-image paths, enabling a viewer to see only a single full-color image, with no horizontal offset and without requiring glasses for the viewing thereof. Preferably, the entire assembly containing the three segments and wedges may be formed as a single unit, requiring only attachments at its two ends to accommodate the pivotal rotation required for introducing and removing the elements associated with the perception of three-dimensionality in the projected image.

Figure 5A:
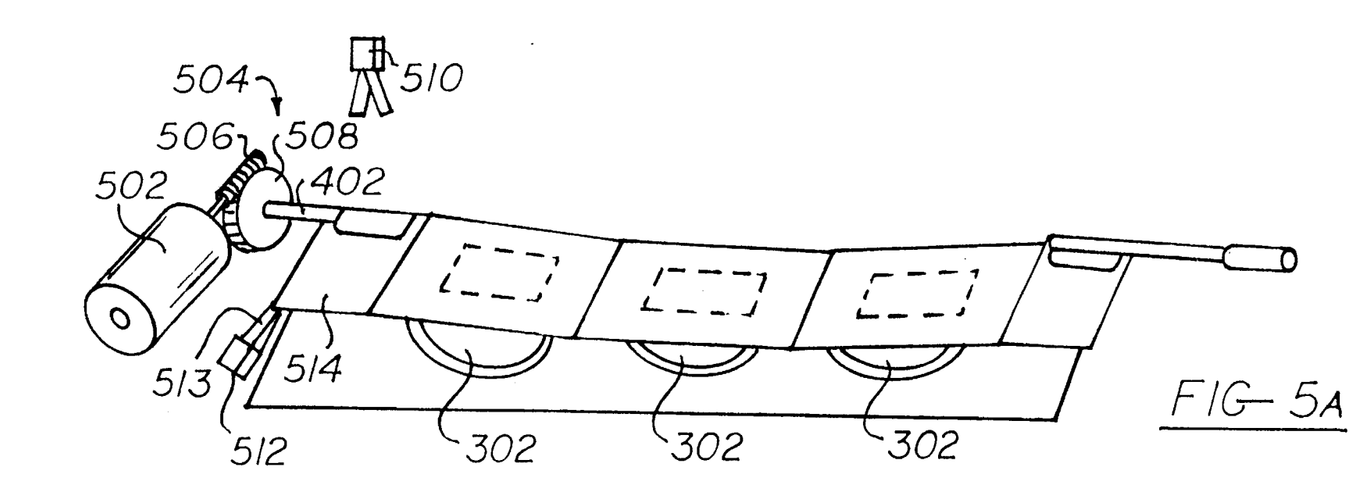
FIG. 5 is an oblique illustration of the system in FIG. 3A, wherein the manually operated translation device is replaced with a remotely-controlled, electronically activated drive mechanism.

FIG. 5 depicts an alternative embodiment wherein the switching means used to translate the wedge prisms and polarizers into and out of their respective beam paths is mechanically driven, and wherein the signal used to activate the driving mechanism may be derived from a remotely controlled hand-held unit. A motor, 502, is drivingly connected to axis 402 by way of gears depicted generally at 504. Preferably, these gears 504 take the form of a worm gear 506 attached to the axis of motor 502, this gear 506 engaging with a circular gear 508 used to rotate rod 402. Two microswitches, an upper microswitch 510, and a lower microswitch 512 are used to sense, respectively, the unpositioned and positioned extent to which the elements associated with creating the three-dimensional effect are translated. Any type of proximity detector may be used instead of these microswitches, including optical interrupters. In operation, motor 502 rotating rod 402 through gears 504 lowers the elements into position over lenses 302 until support member 514 causes the contacts 513 of switch 512 to close, thus halting the operation of motor 502, thereby causing the elements so moved to reach a resting position, as shown in FIG. 5A.

Figure 5B:
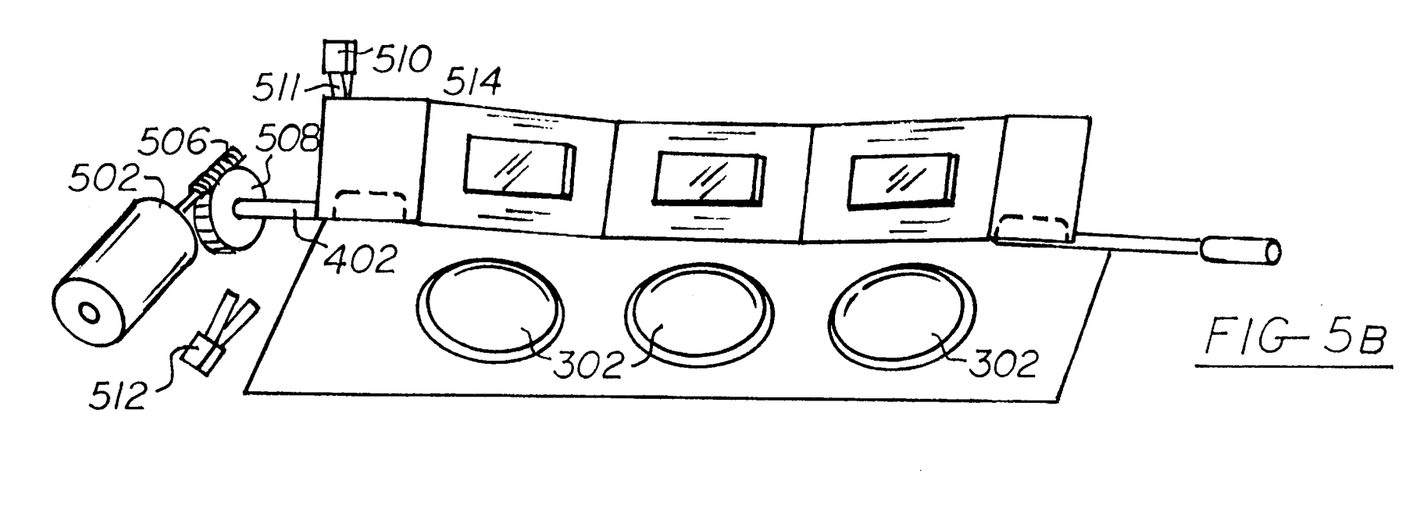

In FIG. 5B, motor 502 has been activated, turning gears 506 and 508, in turn rotating rod 402 clockwise as viewed in the figure, until support member 514 causes contacts 511 of switch 510 to close, thus halting the movement of the elements associated with producing the three-dimensional affect. In this case the elements are entirely removed from their respective beams paths, enabling the viewer to see a conventional two-dimensional picture without the need for glasses.

Although wiring is not shown in FIG. 5, the microswitches and motor would be interconnected to ensure that the motor stops at the appropriate points. The motor and microswitches are further connected to means which allow an operator to activate them. Such means may take the form of a simple on/off switch disposed on a side panel of the television system, or provision may be provided in a hand-held remote-control unit. In the case of remote control, hardware and software may be appropriately modified to facilitate the use of a code or codes dedicated to the operation of the elements associated with the 3-D effects. There are, however, techniques by which the use of remote control may more easily be retrofitted to existing television systems. For example, in some TV systems, a lamp is used to provide visual feedback to an operator when some or any of the buttons on the remote control unit are depressed, apart from the functions with which they are associated. As such, a signal may be derived from the visual indicator associated with button depression generally, in order to make operative the elements associated with the 3-D effect. For example, if any button is depressed longer than would normally be depressed, such as for several seconds, this unusually long time period may be sensed and used to activate and deactivate the devices associated with making the 3-D elements operative.

Having thus described my invention, I claim:

1. A system for imparting a sense of three-dimensionality to a projected television image comprising:

a light-redirecting device which, when placed in the optical path of said projected image, is operative to separate said image into a first version of said image and a second version of said image, said first and second versions of said image being horizontally displaced relative to one another;

the construction of said light-redirecting device in said optical path being such that said first and said second versions of said image exhibit substantially uniform brightness;

a first filter operative to filter said first version;

a second filter operative to filter said second version;

switching means including a first position wherein said light-redirecting device and said filters are operative and a second position wherein said light-redirecting device and said filters are inoperative; and a pair of glasses which enable a wearer of said glasses to view said first version of said image with one eye and said second version with the other eye when said switching means is in said first position.

2. The system of claim 1 wherein said light-redirecting device refracts a portion of said projected image in order to create a horizontally displaced version of said image, said filters being composed of polarizing material with their polarization axes at substantially right angles to one another, wherein said switching means physically translates said light-directing device and said filters into and out of said optical path of said projected image in accordance with said first and said second positions, respectively.

3. The system of claim 1 wherein said light-redirecting device includes one or more wedge prisms.

4. The system of claim 1 wherein said light-redirecting device is a holographic optical element.

5. The system of claim 1 wherein said light-redirecting device and said filters are made operative and inoperative through a remote-control signal.

6. The system of claim 1 wherein said projected television image is formed by converging the projections from a plurality of single-color image sources, the system including a light-redirecting device and filters disposed in the path of each of said projections, all of said light-redirecting devices and said filters being operative when said switching means is in said first position, and all of said light-redirecting devices and said filters being inoperative when said switching means is in said second position.

7. The system of claim 1 wherein said light-redirecting device includes compensation as a function the color wavelength in order to maintain convergence when said light-redirecting device is made operative.

8. The system of claim 1 wherein either of said first or second version of said image is said projected image.

9. A system for creating the illusion of three-dimensionality in a projected television image, comprising:

at least one wedge prism which, when positioned in a first portion of the path of said projected television image is operative to divide said image into two horizontally displaced versions of said image, the construction of said wedge prism being such that said horizontally displaced versions of said image exhibit substantially uniform brightness;

a first polarizer configured for positioning in said first portion of said path of said projected image;

a second polarizer configured for positioning in said path of said projected image not occupied by said wedge prism, the polarization of said first and said second polarizers being at right angles to each other;

a pivotable mounting frame upon which said wedge prism and said polarizers are supported, said frame being adapted for permanent installation relative to the path of said projected television image, said installation providing a first position wherein said wedge prism and said polarizers are disposed in the path of said projected television image, and a second position, wherein said wedge prism and said polarizers are pivotably removed from said path of said projected image;

a third polarizer disposed over one eye of the viewer of said displaced images; and a fourth polarizer disposed over the other eye of said viewer of said displaced images, the axes of polarization said first and said third polarizers being parallel, the axes of polarization of said second and said fourth polarizers being parallel, whereby an observer synthesizes three-dimensionality from the images presented.

10. The system of claim 9 further including remote-control means enabling said user of said system to transfer said wedge prism and said polarizers into and out of said path of said projected image from a remote location.

11. The system of claim 9 including a plurality of wedge prisms and associated polarizers, each associated with different single-color projections which converge to form said horizontally displaced versions of said image.

12. The system of claim 11 wherein said light-redirecting device includes compensation as a function of the wavelength of said single-color projections in order to improve convergence.

13. The system of claim 9 wherein said wedge prism is positioned across a central, horizontal portion with respect to the path of the projected image.

14. The system of claim 11 wherein the positioning of said wedge prisms is such that said horizontally displaced versions of said image exhibit uniform brightness.

15. The system of claim 14 wherein each of said wedge prisms are positioned across a central, horizontal portion with respect to the path of their respective projected images.

16. A system adapted for installation on a video projector which provides a viewer wearing glasses having oppositely polarized lenses a sense of three-dimensionality in the projected image, the system comprising:

a light-redirecting element to separate said projected image into first and second versions of said image, the two versions being horizontally displaced with respect to one another upon projection, the construction of said light-redirecting element being such that said first and said second versions of said image exhibit substantially uniform brightness;

a first polarizer matched to one of said polarized lenses for filtering said first version of said image;

a second polarizer matched to the other of said polarized lenses for filtering said second version of said image;

means for permanently mounting said light-redirecting element and said first and second polarizers on said video projector, including a first position wherein said light-redirecting element and said polarizers are disposed within the path of said projected image and a second position wherein said light-redirecting element and said polarizers are removed therefrom.

17. The system of claim 16 wherein said first and said second positions are remotely controlled.

18. The system of claim 16 wherein said projected image is a forward-projection image.

19. The system of claim 16 wherein said projected image is a rear-projection image.

20. The system of claim 16 including a plurality of light-redirecting elements and associated polarizers, each associated with different single-color projections which converge to form said horizontally displaced versions of said image.

21. The system of claim 1 wherein the light-redirecting device has a height less than the vertical dimension of said optical path and said device is disposed in a horizontal band across a central portion of said path so that said first and said second versions of said image exhibit uniform brightness.

* * * * *